US011161964B2

(12) United States Patent
Usui et al.

(10) Patent No.: US 11,161,964 B2
(45) Date of Patent: Nov. 2, 2021

(54) ETHYLENE-VINYL ALCOHOL COPOLYMER COMPOSITION, MELT-FORMING MATERIAL, AND MULTILAYER STRUCTURE

(71) Applicant: Mitsubishi Chemical Corporation, Tokyo (JP)

(72) Inventors: Shintaro Usui, Tokyo (JP); Minako Ikeshita, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 16/811,456

(22) Filed: Mar. 6, 2020

(65) Prior Publication Data
US 2020/0207945 A1 Jul. 2, 2020

Related U.S. Application Data

(63) Continuation of application No. PCT/JP2018/043110, filed on Nov. 22, 2018.

(30) Foreign Application Priority Data

Nov. 22, 2017 (JP) .............................. JP2017-224605

(51) Int. Cl.
C08K 5/09 (2006.01)
B32B 27/06 (2006.01)
B32B 27/30 (2006.01)
C08K 5/101 (2006.01)

(52) U.S. Cl.
CPC ............... C08K 5/09 (2013.01); B32B 27/06 (2013.01); B32B 27/306 (2013.01); C08K 5/101 (2013.01)

(58) Field of Classification Search
CPC .......... C08K 5/09; C08K 5/101; B32B 27/06; B32B 27/306; B29K 2105/0044; B29K 2023/086; C08L 29/04; B29B 9/12
See application file for complete search history.

(56) References Cited

U.S. PATENT DOCUMENTS 5,744,547 A 4/1998 Moritani et al.
2012/0141642 A1* 6/2012 Kubik .................. B32B 7/12
426/133

2013/0040087 A1 2/2013 Kazeto et al.
2015/0041462 A1 2/2015 Nakazawa et al.
2015/0105508 A1 4/2015 Nakazawa et al.
2016/0221314 A1* 8/2016 Kawai ................. C08L 23/0861
2016/0229987 A1 8/2016 Kawai et al.
2016/0243746 A1 8/2016 Kawai
2016/0251500 A1 9/2016 Kawai
2018/0319965 A1 11/2018 Seno et al.
2019/0077945 A1 3/2019 Hashimoto et al.

FOREIGN PATENT DOCUMENTS

| EP | 2 554 590 | 2/2013 |
|---|---|---|
| EP | 2 554 592 | 2/2013 |
| EP | 3 053 960 | 8/2016 |
| JP | H09-71620 A | 3/1997 |
| WO | 2011/125736 A1 | 10/2011 |
| WO | 2013/146961 A1 | 10/2013 |
| WO | 2013/146962 A1 | 10/2013 |
| WO | 2015/041258 A1 | 3/2015 |
| WO | 2015/050221 A1 | 4/2015 |
| WO | 2015/050222 A1 | 4/2015 |
| WO | 2017/082063 A1 | 5/2017 |
| WO | 2017/204272 A1 | 11/2017 |

OTHER PUBLICATIONS

ISR issued in WIPO Patent Application No. PCT/JP2018/043110, dated Feb. 26, 2019, English translation.
IPRP issued in WIPO Patent Application No. PCT/JP2018/043110, dated May 26, 2020, English translation.
ISR issued in WIPO Patent Application No. PCT/JP2017/019451, dated Aug. 15, 2017, English translation.
IPRP issued in WIPO Patent Application No. PCT/JP2017/019451, dated Nov. 27, 2018, English translation.
SESR issued in EP Patent Application No. 18880273.0, Dec. 15, 2020.

* cited by examiner

Primary Examiner — Callie E Shosho
Assistant Examiner — Bethany M Miller
(74) Attorney, Agent, or Firm — Greenblum & Bernstein, P.L.C.

(57) ABSTRACT

An ethylene-vinyl alcohol copolymer composition is provided, which is resistant to coloration. The ethylene-vinyl alcohol copolymer composition contains: (A) an ethylene-vinyl alcohol copolymer; (B) sorbic acid; and (C) a sorbic acid ester; wherein the sorbic acid ester (C) is present in an amount of 0.00001 to 10 ppm based on the weight of the ethylene-vinyl alcohol copolymer composition; wherein sorbic acid (B) and the sorbic acid ester (C) are present in a weight ratio (B)/(C) of 100 to 100,000.

4 Claims, No Drawings

ETHYLENE-VINYL ALCOHOL COPOLYMER COMPOSITION, MELT-FORMING MATERIAL, AND MULTILAYER STRUCTURE

RELATED APPLICATION

This application is a continuation of International Application No. PCT/JP2018/043110, filed on Nov. 22, 2018, which claims priority to Japanese Patent Application No. 2017-224605, filed on Nov. 22, 2017, the entire contents of each of which being hereby incorporated by reference.

TECHNICAL FIELD

The present disclosure relates to an ethylene-vinyl alcohol copolymer composition (hereinafter referred to as "EVOH resin composition") containing an ethylene-vinyl alcohol copolymer (hereinafter referred to as "EVOH"), a melt-forming material prepared by using the EVOH resin composition, and a multilayer structure. More specifically, the present disclosure relates to an EVOH resin composition less susceptible to coloration, a melt-forming material formed from the EVOH resin composition, and a multilayer structure including a layer formed from the EVOH resin composition.

BACKGROUND ART

EVOH is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials.

However, EVOH contains relatively active hydroxyl groups in its molecule and, therefore, is liable to be thermally degraded. Accordingly, EVOH is susceptible to coloration during melt forming.

On the other hand, a resin composition that contains an EVOH and an unsaturated aldehyde, wherein the unsaturated aldehyde is present in an amount of not less than 0.01 ppm and not greater than 100 ppm based on the amount of the resin composition (see, for example, PTL 1) is known as a resin composition that can suppress fisheyes, gelation, streaks, and other defects during melt forming, and can be formed into products such as containers and films excellent in appearance. Where the resin composition further contains a conjugated polyene compound, oxidative degradation of the resin composition can be suppressed during melt forming. PTL 1 states that the resin composition can suppress coloration, fisheyes, and other defects, and improve the appearance of the formed products, and is excellent in long-run property.

RELATED ART DOCUMENT

Patent Document

PTL 1: WO2013/146961

SUMMARY

However, an aldehyde compound such as an unsaturated aldehyde is liable to cause bad odor even if contained in a very small amount in the resin composition. Particularly, when the resin composition is exposed to a high temperature in a forming process, the aldehyde compound is liable to vaporize to thereby impair the working environment. This makes it difficult to use the aldehyde compound. Therefore, there is a demand for an EVOH resin composition that is less susceptible to thermal degradation during heating in melt kneading and melt forming, and can be formed into a high-quality product.

In view of the foregoing, the inventors conducted intensive studies and, as a result, found that, where an EVOH resin composition contains sorbic acid and a specific very small amount of a sorbic acid ester in combination, and the weight ratio between sorbic acid and the sorbic acid ester contained in the EVOH resin composition falls within a predetermined range, the aforementioned problems can be solved, even where no aldehyde is present in the EVOH resin composition.

According to a first aspect of the present disclosure, there is provided an EVOH resin composition containing: (A) an EVOH; (B) sorbic acid; and (C) a sorbic acid ester; wherein the sorbic acid ester (C) is present in an amount of 0.00001 to 10 ppm based on the weight of the EVOH resin composition; wherein sorbic acid (B) and the sorbic acid ester (C) are present in a weight ratio (B)/(C) of 100 to 100,000. According to a second aspect of the present disclosure, a melt-forming material formed from the EVOH resin composition is provided. According to a third aspect of the present disclosure, a multilayer structure including a layer formed from the EVOH resin composition is provided.

The EVOH resin composition of the present disclosure contains the EVOH (A), sorbic acid (B), and the sorbic acid ester (C). In the EVOH resin composition, the sorbic acid ester (C) is present in an amount of 0.00001 to 10 ppm based on the weight of the EVOH resin composition, and sorbic acid (B) and the sorbic acid ester (C) are present in a weight ratio (B)/(C) of 100 to 100,000. Therefore, the EVOH resin composition has an excellent suppression of heat coloration during melt kneading and melt forming.

Where sorbic acid (B) is present in an amount of 10 to 1,000 ppm based on the weight of the EVOH resin composition, the coloration-suppressing effect is further improved.

Where the sorbic acid ester (C) is an alkyl sorbate, the coloration-suppressing effect is still further improved.

The melt-forming material formed from the EVOH resin composition of the present disclosure is less susceptible to coloration. Therefore, the melt-forming material can be advantageously used as a packaging material for foods, chemical agents, agricultural chemicals, and the like.

The multilayer structure including the layer formed from the EVOH resin composition of the present disclosure is less susceptible to the coloration. Therefore, the multilayer structure can be formed into various products, which can be advantageously used as packaging materials, for example, for foods, chemical agents, agricultural chemicals, and the like.

DESCRIPTION OF EMBODIMENTS

Preferred embodiments of the present disclosure will hereinafter be described in detail. It should be understood that these preferred embodiments are illustrative but not limitative.

EVOH Resin Composition

An EVOH resin composition of the present disclosure contains: (A) an EVOH; (B) sorbic acid; and (C) a sorbic acid ester. The EVOH resin composition of the present disclosure contains the EVOH (A) as a major component. In the EVOH resin composition, the proportion of the EVOH (A) is typically not less than 70 wt. %, preferably not less than wt. %, more preferably not less than 90 wt. %. The components of the EVOH resin composition of the present disclosure will hereinafter be described in turn.

EVOH (A)

The EVOH (A) to be used in the present disclosure is a water-insoluble thermoplastic resin that is typically prepared by copolymerizing ethylene and a vinyl ester monomer and then saponifying the resulting copolymer, and is generally referred to as ethylene-vinyl alcohol copolymer or saponified ethylene-vinyl ester copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and generally further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters are typically each used alone or, as required, a plurality of vinyl esters may be selected from these vinyl esters to be used in combination.

The ethylene structural unit content of the EVOH (A), which is measured in conformity with ISO14663, is typically 20 to 60 mol %, preferably 25 to 50 mol %, particularly preferably 25 to 45 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The vinyl ester saponification degree of the EVOH (A), which is measured in conformity with JIS K6726 (with the use of a solution obtained by homogenously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may further contain a structural unit derived from any of the following comonomers in an amount that does not impair the effects of the present disclosure (e.g., typically in an amount of not greater than 20 mol %, preferably not greater than 10 mol %, of the EVOH (A)).

The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products (acylation products) of these hydroxyl-containing α-olefins such as 3,4-diacyloxy-1-butene, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxymethyl vinylidenes such as 1,3-hydroxy-2-methylenepropane and 1,5-hydroxy-3-methylenepentane, and esterification products of these hydroxymethyl vinylidenes (i.e., vinylidene diacetates) such as 1,3-diacetoxy-2-methylenepropane, 1,3-dipropionyloxy-2-methylenepropane, and 1,3-dibutyronyloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1 to C18 alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH containing a structural unit having a primary hydroxyl group in its side chain out of structural units derived from the aforementioned comonomers is preferred because the secondary formability is improved in stretching process, vacuum pressure forming process, and the like. Particularly, an EVOH containing a structural unit having 1,2-diol in its side chain is preferred.

Where the EVOH (A) contains the structural unit having the primary hydroxyl group in its side chain, the primary hydroxyl group content is typically 0.1 to 20 mol %, preferably 0.1 to 15 mol %, particularly preferably 1 to 10 mol %.

The EVOH (A) may be a mixture of different EVOHs. These EVOHs may have different contents of the ethylene structural unit, different contents of the structural unit having the primary hydroxyl group in the side chain, different saponification degrees, and different melt flow rates (MFRs), and contain different comonomer components.

In the present disclosure, post-modified EVOHs such as urethanized EVOH, acetalized EVOH, cyanoethylated EVOH, and oxyalkylenated EVOH are also usable as the EVOH (A).

Sorbic Acid (B)

Sorbic acid (B) is an unsaturated fatty acid having a conjugated double bond in its structure.

The amount of sorbic acid (B) contained in the EVOH resin composition is typically 10 to 1,000 ppm, preferably 50 to 700 ppm, more preferably 100 to 600 ppm, based on the weight of the EVOH resin composition. Where the amount of sorbic acid (B) falls within the aforementioned range, the coloration-suppressing effect tends to be efficiently provided. If the amount of sorbic acid (B) is excessively great, the number of conjugated double bonds is excessively great, so that the coloration tends to result.

In the case of pellets and other products formed from the EVOH resin composition of the present disclosure, the amount of sorbic acid (B) contained in the EVOH resin composition is measured in the following manner. A sample is prepared by pulverizing the formed product (e.g., the pellets) by a given method (e.g., a freeze-pulverizing method), and dissolving the pulverized product in a C1 to C5 lower alcohol solvent. The sample is analyzed by a liquid chromatography/mass spectrometry (LC/MS/MS) method, whereby the amount of sorbic acid (B) is determined.

In the case of a formed product containing the EVOH resin composition and some other thermoplastic resin or the like (e.g., a multilayer structure), a layer of the EVOH resin composition to be analyzed is taken out of the multilayer structure by a given method, and the measurement is performed in the aforementioned manner.

Sorbic Acid Ester (C)

In the present disclosure, the EVOH resin composition contains sorbic acid (B) and a specific very small amount of the sorbic acid ester (C), and the weight ratio between sorbic acid (B) and the sorbic acid ester (C) falls within a specific range, whereby a remarkable coloration-suppressing effect is provided.

Conjugated polyene compounds such as sorbic acid and sorbic acid esters are known as additives that suppress the heat coloration of the EVOH resin composition.

In the present disclosure, a remarkable coloration-suppressing effect is unexpectedly provided by using the specific very small amount of the sorbic acid ester in combination with sorbic acid and adjusting the weight ratio between sorbic acid and the sorbic acid ester within the specific range. Thus, the EVOH resin composition can have an excellent heat coloration-suppressing effect.

In the present disclosure, it is supposed that the coloration is suppressed because the sorbic acid ester (C) has a lower polarity than sorbic acid (B) and, therefore, can be homogeneously dispersed in the EVOH resin composition even if being contained in a very small amount in the EVOH resin composition. It is also supposed that a catalytic cycle occurs that includes: Stage (1) in which, when the EVOH resin composition is heated, the specific very small amount of the sorbic acid ester (C) is hydrolyzed to generate sorbic acid, which in turn captures radicals that may otherwise cause oxidative degradation; Stage (2) in which an alcohol resulting from the hydrolysis of the sorbic acid ester (C) captures sorbic acid capturing the radicals, whereby the sorbic acid ester (C) is generated; and Stage (3) in which the sorbic acid ester (C) thus generated is thermally hydrolyzed again. Further, it is supposed that, after sorbic acid (B) contained in the EVOH resin composition of the present disclosure captures the radicals, sorbic acid (B) is incorporated to Stage (2) of the catalytic cycle.

Thus, it is supposed that sorbic acid capable of capturing the radicals constantly occurs and, therefore, the radicals can be captured in the EVOH resin composition at the early stage of the radical generation, making it possible to provide the excellent coloration-suppressing effect. In the present disclosure, it is further supposed that, since the EVOH resin composition contains sorbic acid (B) and the specific very small amount of the sorbic acid ester (C), the aforementioned cycle can efficiently work, making it possible to provide the remarkable coloration-suppressing effect.

A sorbic acid ester prepared by condensation of sorbic acid and an alcohol or a phenol derivative, for example, is usable as the sorbic acid ester (C). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of the alcohol resulting from the hydrolysis of the sorbic acid ester (C) is relatively low, the EVOH resin composition is less susceptible to the coloration. Therefore, the alkyl sorbates are preferred, and alkyl sorbates containing a C1 to C5 alkoxy group are more preferred. Alkyl sorbates containing a C1 to C3 alkoxy group are more preferred, and methyl sorbate and ethyl sorbate are particularly preferred. Ethyl sorbate is especially preferred.

The sorbic acid ester (C) typically has a molecular weight of 120 to 220, preferably 120 to 200, particularly preferably 120 to 160. Where the molecular weight of the sorbic acid ester (C) falls within the aforementioned range, the coloration-suppressing effect tends to be efficiently provided.

The amount of the sorbic acid ester (C) contained in the EVOH resin composition is 0.00001 to 10 ppm, preferably 0.00005 to 5 ppm, more preferably 0.0001 to 4 ppm, particularly preferably 0.0005 to 3 ppm, especially preferably 0.001 to 1.5 ppm, based on the weight of the EVOH resin composition. Where the amount of the sorbic acid ester (C) falls within the aforementioned range, the coloration-suppressing effect can be efficiently provided. If the amount of the sorbic acid ester (C) is excessively great, the number of conjugated double bonds is excessively great, so that the coloration is liable to result.

The amount of the sorbic acid ester (C) contained in the EVOH resin composition of the present disclosure can be measured by the same method as the amount of sorbic acid (B). In the case of a formed product containing the EVOH resin composition and some other thermoplastic resin or the like (e.g., a multilayer structure), the amount of the sorbic acid ester (C) can be measured by the same method as the amount of sorbic acid (B).

In the EVOH resin composition, the weight ratio (B)/(C) between sorbic acid (B) and the sorbic acid ester (C) is (B)/(C)=100 to 100,000, preferably 200 to 95,000, particularly preferably 300 to 90,000. If the weight ratio is excessively low, the coloration-suppressing effect will be deteriorated. If the weight ratio is excessively high, the coloration-suppressing effect will also be deteriorated.

Other Thermoplastic Resin

The EVOH resin composition of the present disclosure may contain a thermoplastic resin other than the EVOH (A) as a resin component typically in an amount of not greater than 30 wt. %, preferably not greater than 10 wt. %, based on the weight of the EVOH resin composition.

Specific examples of the other thermoplastic resin include olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes, and polypentenes, polycycloolefins, polyolefin resins in a broader sense such as modified polyolefin resins obtained by graft-modifying any of the aforementioned olefin homopolymers and copolymers with an unsaturated carboxylic acid or an unsaturated carboxylic acid ester, polystyrene resins, polyester resins, chlorinated vinyl resins such as polyvinyl chlorides and polyvinylidene chlorides, polyamide resins, acrylic resins, vinyl ester resins, polyester elastomers, styrene elastomers, polyurethane elastomers, chlorinated polyethylenes, and chlorinated polypropylenes. These thermoplastic resins may be used alone or in combination. Particularly, any of the polyamide resins and the styrene elastomers is preferably used, because the coloration-suppressing effect of the present disclosure is remarkable.

Other Additives

As required, the EVOH resin composition of the present disclosure may contain known additives in addition to the aforementioned components in amounts that do not impair the effects of the present disclosure (e.g., in amounts of not greater than 10 wt. % based on the overall weight of the EVOH resin composition). Examples of the additives include: plasticizer (e.g., aliphatic polyhydric alcohol such as ethylene glycol, glycerin, hexanediol, or the like); lubricant such as higher fatty acid (e.g., lauric acid, myristic acid, palmitic acid, stearic acid, behenic acid, oleic acid, or the like), higher fatty acid metal salt (e.g., calcium stearate, magnesium stearate, or the like), higher fatty acid ester (e.g., methyl ester, isopropyl ester, butyl ester, octyl ester, or the like of higher fatty acid), higher fatty acid amide (e.g., stearamide, oleamide, or the like), bis-higher fatty acid amide (e.g., ethylene bis-stearamide, or the like), or low-molecular weight polyolefin (e.g., low-molecular weight polyethylene or low-molecular weight polypropylene having a molecular weight of about 500 to about 10,000); drying agent; oxygen absorber; inorganic filler; heat stabilizer; photo stabilizer; flame retardant; crosslinking agent; curing agent; foaming agent; crystal nucleating agent; antifogging agent; biodegradation agent; silane coupling agent; antiblocking agent; antioxidant; colorant; antistatic agent; UV absorber; antibacterial agent; insoluble inorganic double salt (e.g., hydrotalcites or the like); surfactant; and wax. These may be used alone or in combination.

Examples of the heat stabilizer to be used for improving the heat stability and other various physical properties during the melt forming include: organic acids such as acetic acid, propionic acid, and butyric acid, salts of the organic acids such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and salts of the inorganic acids such as alkali metal salts (sodium salts, potassium salts, and the like), alkali earth metal salts (calcium salts, magnesium salts, and the like), and zinc salts of the inorganic acids.

Of these, acetic acid, boron compounds such as boric acid and its salts, acetic acid salts, and phosphoric acid salts are preferably blended as the heat stabilizer.

The amount of acetic acid to be blended as the heat stabilizer is typically 0.001 to 1 part by weight, preferably 0.005 to 0.2 parts by weight, particularly preferably 0.01 to 0.1 part by weight, based on 100 parts by weight of the EVOH (A). If the amount of acetic acid is excessively small, the effect of blending acetic acid tends to be reduced. If the amount of acetic acid is excessively great, on the other hand, it tends to be difficult to form a uniform film.

The amount of a boron compound to be blended as the heat stabilizer is typically 0.001 to 1 part by weight on a boron basis based on 100 parts by weight of the EVOH (A) (as measured by ICP emission spectrometry after ashing). If the amount of the boron compound is excessively small, the effect of blending the boron compound tends to be reduced. If the amount of the boron compound is excessively great, on the other hand, it tends to be difficult to form a uniform film.

The amount of an acetic acid salt or a phosphoric acid salt (or a hydrogen phosphoric acid salt) to be blended as the heat stabilizer is typically 0.0005 to 0.1 part by weight on a metal basis based on 100 parts by weight of the EVOH (A) (as measured by ICP emission spectrometry after ashing). If the amount of the acetic acid salt or the phosphoric acid salt is excessively small, the effect of the blending tends to be reduced. If the amount of the acetic acid salt or the phosphoric acid salt is excessively great, on the other hand, it tends to be difficult to form a uniform film. Where two or more salts are blended in the EVOH resin composition, the total amount of the two or more salts preferably falls within the aforementioned range.

EVOH Resin Composition Production Method

The EVOH resin composition of the present disclosure is produced by using the EVOH (A), sorbic acid (B), and the sorbic acid ester (C) as the essential components, and using any of the aforementioned additives as an optional component as required. Known examples of a method for the production include dry blending method, melt mixing method, solution mixing method, and impregnation method, which may be used in combination.

An example of the dry blending method is a method (I) including the step of dry-blending pellets containing the EVOH (A) with at least one selected from the group consisting of sorbic acid (B) and the sorbic acid ester (C) by means of a tumbler or the like.

Examples of the melt mixing method include: a method (II) including the steps of melt-kneading a dry blend of pellets containing the EVOH (A), and at least one selected from the group consisting of sorbic acid (B) and the sorbic acid ester (C), and forming the resulting melt mixture into pellets or other product; and a method (III) including the steps of adding at least one selected from the group consisting of sorbic acid (B) and the sorbic acid ester (C) to the EVOH (A) in a melted state, melt-kneading the resulting mixture, and forming the resulting melt mixture into pellets or other product.

Examples of the solution mixing method include: a method (IV) including the steps of preparing a solution by using commercially available pellets containing the EVOH (A), adding at least one selected from the group consisting of sorbic acid (B) and the sorbic acid ester (C) to the solution, solidifying and forming the resulting solution into pellets, separating the pellets from the solution, and drying the pellets; and a method (V) including the steps of adding at least one selected from the group consisting of sorbic acid (B) and the sorbic acid ester (C) to a homogeneous solution (water/alcohol solution or the like) of the EVOH after the saponification in the preparation of the EVOH (A), solidifying and forming the resulting solution into pellets, separating the pellets from the solution, and drying the pellets.

An example of the impregnation method is a method (VI) including the steps of bringing pellets containing the EVOH (A) into contact with an aqueous solution containing at least one selected from the group consisting of sorbic acid (B) and the sorbic acid ester (C) to incorporate the at least one of sorbic acid (B) and the sorbic acid ester (C) into the pellets, and then drying the resulting pellets.

In the methods described above, a composition (master batch) containing at least one selected from the group consisting of sorbic acid (B) and the sorbic acid ester (C) at a higher concentration may be prepared by blending the at least one of sorbic acid (B) and the sorbic acid ester (C) in a predetermined proportion with the EVOH (A), and the EVOH resin composition may be produced as containing the at least one of sorbic acid (B) and the sorbic acid ester (C) at a predetermined concentration by blending the master batch with the EVOH (A).

In the present disclosure, different methods may be selected from the aforementioned methods to be used in combination. The method (V) including the steps of adding at least one selected from the group consisting of sorbic acid (B) and the sorbic acid ester (C) to a homogeneous solution (water/alcohol solution or the like) of the EVOH after the saponification in the preparation of the EVOH (A), solidifying and forming the resulting solution into pellets, separating the pellets from the solution, and drying the pellets is preferred in terms of the productivity. Further, the melt mixing method is preferred, and the method (II) is particularly preferred, because the EVOH resin composition produced by these methods is significantly improved in productivity and the effects of the present disclosure.

Where any of the aforementioned additives is contained as the optional component in the EVOH resin composition, the optional component may be blended in the EVOH resin composition according to the aforementioned production methods.

Pellets of the EVOH resin composition to be produced by any of the aforementioned methods, and the pellets of the EVOH (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and tactually identified, and the minor diameter of the maximum sectional plane is measured in the aforementioned manner.

The EVOH resin composition of the present disclosure typically has a water content of 0.01 to 0.5 wt. %, preferably 0.05 to 0.35 wt. %, particularly preferably 0.1 to 0.3 wt. %.

In the present disclosure, the water content of the EVOH resin composition is measured and calculated by the following method.

The weight (W1) of a sample of the EVOH resin composition is measured at a room temperature (25° C.) by an electronic balance before drying, and the sample is dried at 150° C. for 5 hours in a hot air dryer. After the drying, the sample is cooled in a desiccator for 30 minutes. After the temperature of the sample of the EVOH resin composition is returned to the room temperature, the weight (W2) of the sample is measured. The water content of the EVOH resin composition is calculated from the following expression:

Water content (wt. %)=[($W1-W2$)/$W1$]×100

The EVOH resin composition of the present disclosure may be produced in any of various forms, e.g., in pellet form, powdery form, or liquid form, for use as a forming material for various formed products. Particularly, the EVOH resin composition of the present disclosure is preferably provided as a melt forming material, because the effects of the present disclosure tend to be more efficiently provided. The EVOH resin composition of the present disclosure may be a resin composition prepared by mixing the EVOH resin composition with a resin other than the EVOH (A).

The pellets of the EVOH resin composition of the present disclosure may be used as they are for the melt forming. In order to ensure stable feeding of the EVOH resin composition pellets in the melt forming, it is also preferred to apply a known lubricant to surfaces of the pellets. Any of the lubricants described above may be used. The amount of the lubricant present on the pellets is typically not greater than 5 wt. %, preferably not greater than 1 wt. %, based on the weight of the EVOH resin composition.

Exemplary products to be formed from the EVOH resin composition of the present disclosure for practical applications include a single-layer film formed by using the EVOH resin composition of the present disclosure, and a multilayer structure including a layer formed by using the EVOH resin composition of the present disclosure.

Multilayer Structure

A multilayer structure of the present disclosure includes a layer formed from the EVOH resin composition of the present disclosure. The layer formed from the EVOH resin composition of the present disclosure (hereinafter referred to as "EVOH resin composition layer") may be laminated with some other base material (hereinafter referred to as "base resin") containing a thermoplastic resin other than the EVOH resin composition of the present disclosure as a major component. Thus, the EVOH resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred as hydrophobic resins.

Where EVOH resin composition layers a (a1, a2, ...) formed from the EVOH resin composition of the present disclosure and base resin layers b (b1, b2, ...) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layer is provided between the EVOH resin composition layer formed from the EVOH resin composition of the present disclosure and the base resin layer in the multilayer structure, the adhesive resin layer is located in contact with the EVOH resin composition layer and, therefore, a highly hydrophobic adhesive resin is preferably used for the adhesive resin layer.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the weight of the base resin or the adhesive resin). These may be used alone or in combination.

The EVOH resin composition layer formed from the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat setting process.

Further, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like. The layer formed from the EVOH resin composition of the present disclosure is less susceptible to the coloration and, therefore, is particularly useful as a packaging material for foods, chemical agents, agricultural chemicals, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

Prior to implementation of Examples, pellets of the following EVOH (A) were prepared.

EVOH (A): Ethylene-vinyl alcohol copolymer having an ethylene structural unit content of 29 mol %, a saponification degree of 100 mol %, and an MFR of 3.2 g/10 minutes (as measured at 210° C. with a load of 2160 g)

Example 1

An EVOH resin composition was prepared in an aggregated form by preheating a mixture of 100 parts of the pellets of the EVOH (A), 0.04 parts (corresponding to 400 ppm based on the weight of the EVOH resin composition) of sorbic acid (B), and 0.0000005 parts (corresponding to 0.005 ppm based on the weight of the EVOH resin composition) of methyl sorbate (available from FUJIFILM Wako Pure Chemical Corporation, and having a molecular weight of 126) as the sorbic acid ester (C) at 230° C. for 5 minutes by means of a plastograph (available from Brabender Corporation), then melt-kneading the mixture at 230° C. for 5 minutes while operating the plastograph at 50 rpm, and cooling and solidifying the resulting melt mixture. The EVOH resin composition thus prepared was pulverized by means of a crusher (SKR16-240 available from Sometani Sangyo Co., Ltd.) with its rotary blade operated at a rotation speed of 650 rpm. The pulverized product of the EVOH resin composition was in a granular form having a size of 1- to 5-mm square. The resin composition had a water content of 0.22%.

Example 2

An EVOH resin composition and a pulverized product of Example 2 were produced in substantially the same manner as in Example 1, except that the amount of methyl sorbate was 0.0001 part (corresponding to 1 ppm based on the weight of the EVOH resin composition). The resin composition had a water content of 0.14%.

Example 3

An EVOH resin composition and a pulverized product of Example 3 were produced in substantially the same manner as in Example 1, except that ethyl sorbate (available from FUJIFILM Wako Pure Chemical Corporation, and having a molecular weight of 140) was used instead of methyl sorbate. The resin composition had a water content of 0.17%.

Comparative Example 1

An EVOH resin composition and a pulverized product of Comparative Example 1 were produced in substantially the same manner as in Example 1, except that methyl sorbate was not blended. The resin composition had a water content of 0.12%.

Comparative Example 2

An EVOH resin composition and a pulverized product of Comparative Example 2 were produced in substantially the same manner as in Example 1, except that the amount of methyl sorbate was 0.0015 parts (corresponding to 15 ppm based on the weight of the EVOH resin composition). The resin composition had a water content of 0.24%.

Comparative Example 3

A pulverized product of Comparative Example 3 was produced in substantially the same manner as in Example 1, except that neither sorbic acid (B) nor the sorbic acid ester (C) were blended, and that the EVOH (A) was used alone, and melt-kneaded and pulverized in the same manner as in Example 1. The EVOH (A) had a water content of 0.11%.

The pulverized products of Examples 1 to 3 and Comparative Examples 1 to 3 were evaluated for coloration by the following method. The results are shown below in Table 1.

Coloration Evaluation

The pulverized products were each used as a sample. A cylindrical container having an inner diameter of 32 mm and a height of 30 mm was fully filled with the sample, and the YI value of the sample was measured by means of a spectrophotometer SE6000 available from Nippon Denshoku Industries Co., Ltd. A higher YI value measured at this time means that the pulverized product was yellowed after the melt kneading. Then, the sample was heat-treated at 150° C. for 5 hours in an air atmosphere in an oven, and then the YI value of the sample was measured in the same manner. A higher YI value measured at this time means that the pulverized product was yellowed after the heat treatment.

TABLE 1

|  | Example 1 | Example 2 | Example 3 | Comparative Example 1 | Comparative Example 2 | Comparative Example 3 |
|---|---|---|---|---|---|---|
| Sorbic acid (B) (ppm) | 400 | 400 | 400 | 400 | 400 | — |
| Sorbic acid ester (C) | | | | | | |
| Type | Methyl sorbate | Methyl sorbate | Ethyl sorbate | — | Methyl sorbate | — |
| Amount (ppm) | 0.005 | 1 | 0.005 | — | 15 | — |
| Weight ratio of sorbic acid (B)/sorbic acid ester (C) | 80,000 | 400 | 80,000 | — | 27 | — |
| YI value after melt kneading | 22 | 21 | 22 | 24 | 24 | 33 |
| YI value after heat treatment at 150° C. for 5 hours following melt kneading | 50 | 48 | 45 | 51 | 52 | 54 |

As shown above in Table 1, the EVOH resin composition of Comparative Example 1 containing sorbic acid (B) had slightly lower YI values than the EVOH resin composition of Comparative Example 3 containing neither sorbic acid (B) nor the sorbic acid ester (C). The EVOH resin composition of Comparative Example 2 containing sorbic acid (B) and the sorbic acid ester (C) wherein the sorbic acid ester (C) was present in a greater amount had the same YI value as the EVOH resin composition of Comparative Example 1 containing sorbic acid (B) alone after the melt kneading, but had a slightly higher YI value than the EVOH resin composition of Comparative Example 1 after the heat treatment at 150° C. for 5 hours following the melt kneading.

In contrast, the EVOH resin compositions of Examples 1 to 3 each containing sorbic acid (B) and a specific very small amount of the sorbic acid ester (C) wherein the weight ratio between sorbic acid (B) and the sorbic acid ester (C) fell within the specific range each unexpectedly had a lower YI value after the melt kneading and, hence, were less susceptible to the coloration during the melt kneading than the EVOH resin composition of Comparative Example 1 containing sorbic acid (B) alone and the EVOH resin composition of Comparative Example 2 containing sorbic acid (B) and the sorbic acid ester (C) wherein the sorbic acid ester (C) was present in a greater amount. Further, the EVOH resin compositions of Examples 1 to 3 each had a lower YI value and, hence, are less susceptible to the coloration after the heat treatment at 150° C. for 5 hours following the melt kneading than the EVOH resin compositions of Comparative Examples 1 and 2.

Multilayer structures produced by using the respective EVOH resin compositions of Examples are less susceptible to the coloration.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is less susceptible to coloration attributable to thermal degradation and, therefore, is particularly useful for various packaging materials for various foods, condiments such as mayonnaise and dressing, fermented foods such as miso, fat and oil such as salad oil, beverages, cosmetics, pharmaceutical products, and the like.

The invention claimed is:

1. An ethylene-vinyl alcohol copolymer composition comprising:
(A) an ethylene-vinyl alcohol copolymer;
(B) sorbic acid; and
(C) a sorbic acid ester;
wherein the sorbic acid ester (C) is an alkyl sorbate;
wherein the sorbic acid ester (C) is present in an amount of 0.00001 to 10 ppm based on a weight of the ethylene-vinyl alcohol copolymer composition; and
wherein sorbic acid (B) and the sorbic acid ester (C) are present in a weight ratio (B)/(C) of 100 to 100,000.

2. The ethylene-vinyl alcohol copolymer composition according to claim 1, wherein sorbic acid (B) is present in an amount of 10 to 1,000 ppm based on the weight of the ethylene-vinyl alcohol copolymer composition.

3. A melt-forming material comprising the ethylene-vinyl alcohol copolymer composition according to claim 1.

4. A multilayer structure comprising a layer that comprises the ethylene-vinyl alcohol copolymer composition according to claim 1.

* * * * *